(12) United States Patent
Munsil et al.

(10) Patent No.: US 10,126,964 B2
(45) Date of Patent: Nov. 13, 2018

(54) HARDWARE BASED MAP ACCELERATION USING FORWARD AND REVERSE CACHE TABLES

(71) Applicant: Seagate Technology LLC, Cupertino, CA (US)

(72) Inventors: Jeffrey Munsil, Fort Collins, CO (US); Jackson Ellis, Fort Collins, CO (US); Ryan J. Goss, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/605,442

(22) Filed: May 25, 2017

(65) Prior Publication Data

US 2018/0275899 A1  Sep. 27, 2018

Related U.S. Application Data

(60) Provisional application No. 62/476,178, filed on Mar. 24, 2017.

(51) Int. Cl.
| | |
|---|---|
| *G06F 12/00* | (2006.01) |
| *G06F 3/06* | (2006.01) |
| *G06F 12/0873* | (2016.01) |
| *G06F 12/0811* | (2016.01) |

(52) U.S. Cl.
CPC .......... *G06F 3/0619* (2013.01); *G06F 3/065* (2013.01); *G06F 3/0659* (2013.01); *G06F 3/0688* (2013.01); *G06F 12/0811* (2013.01); *G06F 12/0873* (2013.01); *G06F 2212/283* (2013.01)

(58) Field of Classification Search
None
See application file for complete search history.

(56) References Cited

U.S. PATENT DOCUMENTS

| | | | | |
|---|---|---|---|---|
| 5,933,857 | A * | 8/1999 | Brewer | G06F 12/0284 |
| | | | | 711/141 |
| 6,804,741 | B2 | 10/2004 | Cowan | |
| 7,844,778 | B2 | 11/2010 | Shen et al. | |
| 8,495,299 | B2 | 7/2013 | Fuller et al. | |
| 8,533,401 | B2 | 9/2013 | Edirisooriya et al. | |
| 9,250,901 | B2 | 2/2016 | Sodhi et al. | |
| 9,405,672 | B2 | 8/2016 | Canepa et al. | |
| 2014/0047170 | A1 | 2/2014 | Cohen et al. | |
| 2014/0379965 | A1 * | 12/2014 | Gole | G06F 12/0246 |
| | | | | 711/103 |
| 2018/0088837 | A1 * | 3/2018 | Zhou | G06F 3/0619 |

* cited by examiner

*Primary Examiner* — John A Lane
(74) *Attorney, Agent, or Firm* — Hall Estill Attorneys at Law

(57) ABSTRACT

Apparatus and method for managing map data in a data storage device. A programmable processor issues a find command to locate and place a requested map page of a map structure into a first cache to service a received host command. A non-programmable hardware circuit searches a forward table to determine whether the requested map page is in a second cache, and if so, loads the map page to the first cache. If not, the hardware circuit requests the requested map page from a back end processor which retrieves the requested map page from a non-volatile memory (NVM), such as a flash memory array. The hardware circuit searches a reverse table and the first cache to select a candidate location in the second cache for the retrieved requested map page from the NVM, and directs the storage of a copy of the requested map page at the candidate location.

20 Claims, 6 Drawing Sheets

HARDWARE BASED MAP ACCELERATION USING FORWARD AND REVERSE CACHE TABLES

RELATED APPLICATION

The present application makes a claim of domestic priority under 35 U.S.C. 119(e) to U.S. Provisional Application No. 62/476,178 filed Mar. 24, 2017, the contents of which are hereby incorporated by reference.

SUMMARY

Various embodiments of the present invention are generally directed to data management in a data storage device.

In some embodiments, an apparatus has a map structure stored in a non-volatile memory (NVM) as a plurality of map pages that associate logical addresses of user data blocks with physical addresses in the NVM at which the user blocks are stored. A first cache stores a copy of a first subset of the map pages stored in the NVM, and a second cache stores a copy of the first subset of the map pages as well as a copy of a second subset of the map pages stored in the NVM.

A programmable processor has programming stored in an associated memory which, when executed, issues a find command to locate and place a requested map page associated with a received host command into the first cache. A non-programmable hardware circuit is configured to, responsive to the find command, direct a retrieval of the requested map page from the NVM, access a reverse table in a memory to identify a potential replacement map page stored at a selected physical address in the second cache, and direct a writing of a copy of the requested map page to the selected physical address in the second cache responsive to a determination by the non-programmable hardware circuit that the potential replacement map page is not in the first subset of the map pages in the first cache.

These and other features and advantages which characterize various embodiments of the present disclosure can be understood in view of the following detailed discussion and the accompanying drawings.

DETAILED DESCRIPTION

Figure 1:
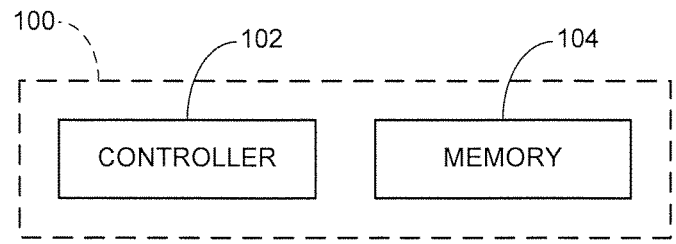
FIG. 1 provides a functional block representation of an exemplary data storage device in accordance with various embodiments of the present disclosure.

The present disclosure generally relates to data storage, and more particularly to a method and apparatus for managing map data in a data storage device using a hardware circuit to offload cache management tasks from a programmable processor.

Data storage devices are used to store and retrieve user data in a fast and efficient manner. Map structures are often used to track the physical locations of user data stored in a main memory of a storage device to enable the device to locate and retrieve previously stored data. Such map structures may associate logical addresses for data blocks received from a host with physical addresses of the media, as well as other status information associated with the data.

The management of map structures can provide a significant processing bottleneck to a storage device controller in servicing access commands (e.g., read commands, write commands, status commands, etc.) from a host device. This is particularly true for flash memory and other forms of erasable media. In a flash memory based storage device such as an SSD, each subsequently received version of a given data block will be stored to a different location within the flash memory.

Various embodiments of the present disclosure are generally directed to the management of data in a data storage device. As explained below, in some embodiments a data storage device is provided with a controller circuit and a main memory characterized as a non-volatile memory, or NVM. The NVM may take the fot in of a flash memory array.

The controller circuit provides top level controller functions to direct the transfer of user data blocks between the NVM and a host device. The user data blocks stored in the NVM are described by a map structure having a plurality of map pages that describe the relationship between logical addresses used by the host device and physical addresses of the NVM. The map structure may be a multi-level map structure or may take other forms.

The controller circuit includes a programmable processor that uses programming (e.g., firmware) stored in a memory location to process host access commands. The map page or pages for the data associated with each received access command needs to be loaded to a first cache of a multi-cache structure before the command can be serviced.

The multi-cache structure includes the first cache and at least a second cache. Additional cache levels can be used as well. A small (first) subset of the map pages are maintained in the first cache. The second cache stores a larger subset of the map pages, so that every map page in the first cache is also maintained in the second cache. Another way of viewing this is that the second cache stores the first subset of the map pages, and the second cache stores the first subset as well as a second subset of the map pages. All of the map pages (e.g., the entire map structure) are also maintained in the NVM.

The programmable processor offloads certain operations to a non-processor based hardware circuit to locate and load map pages to the first cache. In response to a find command from the processor, the hardware circuit first performs a search (e.g., an access operation) to determine if a requested (first) map page is already resident in the first cache. If so, the hardware circuit notifies the processor of the associated address (cache line) within the first cache.

In the event of a cache miss on the first cache (e.g., the requested map page is not resident in the first cache), the hardware circuit searches a forward table in a memory which identifies logical addresses associated with each of the map pages stored in the second cache. If the forward table indicates the requested map page is in the second cache, the hardware circuit copies the requested map page from the second cache to the first cache and notifies the processor. Since the first cache is usually full, at least one existing map page may need to be evicted from the first cache to make room for the requested map page. The processor may identify a victim (replacement) map page in the first cache along with the find command to be replaced by the requested map page, if necessary.

In the event of a cache miss on the second cache (e.g., the requested map page is not located in the second cache), the hardware circuit directs two concurrent operations: the retrieval of the requested map page from the NVM (e.g., flash), and the selection of a candidate (second) map page in the second cache to be replaced by the requested map page.

In order to retrieve the requested map page from the NVM, the hardware circuit accesses a first level map of the map structure to locate the flash address of the requested map page, and issues a request to a back end processor of the controller to retrieve the requested map page from the NVM into a local memory.

In order to identify the potential replacement map page in the second cache to be replaced by the requested map page, the hardware circuit identifies a selected physical address in the second cache, and searches a reverse table in a local memory. The reverse table identifies the physical addresses at which each of the map pages are stored in the second cache. Thus, the reverse table identifies the potential replacement map page that is stored at the selected physical address. The hardware circuit searches the first cache to determine if the potential replacement map page is also resident in the first cache. If so, a new physical address in the second cache is selected and the process is repeated until the potential replacement map page is identified as a candidate for replacement. A first-in-first-out (FIFO) list or similar mechanism can be used to track and select candidate physical addresses for eviction of the contents thereof from the second cache (e.g., overwriting at that location with the new page). The potential replacement pages may be supplied from a first in first out (FIFO) list in a local memory managed by the programmable processor.

The FIFO mechanism can take a variety of forms. In some cases, a counter can be used that wraps from a first location 0 to a final location N-1, then back to 0. The counter values are used such that the system replaces location 0, then 1, then 2, and so on up to N-1, after which the count returns to 0 again. Any location that is determined to be in the first cache is skipped. If a given operation ends at a first count value (e.g., location 3 is updated), the next evaluation cycle begins at the next count value in the sequence (e.g., location 4).

The foregoing operations are blocking and atomic. The hardware circuit may physically write the map pages to the respective first and second caches, or may establish pointers that can be used by the programmable processor to locate and use the requested map pages. In this way, various map locating functions can be carried out by separate hardware without the need to occupy the programmable processor, enabling the processor to perform higher priority tasks and accelerate the data transfer rate I/O performance of the storage device.

These and other features and advantages of various embodiments of the present disclosure can be understood beginning with a review of FIG. 1 which provides a simplified functional block representation of a data storage device 100.

The device 100 includes a controller 102 and a memory module 104. The controller 102 provides top level control for the device 100 and may be configured as a number of circuit elements that include a programmable processor with associated programming in local memory as well as one or more non-processor based hardware circuits.

The memory module 104 can be arranged as one or more non-volatile memory elements such as rotatable recording media (discs) and solid-state memory arrays. While a separate controller 102 is shown in FIG. 1, such is unnecessary as alternative embodiments may incorporate any requisite controller functions directly into the memory module.

The memory module 104 serves as a main store for user data from a host device. The host device can be any device that communicates with the storage device 100. For example and not by way of limitation, the storage device may be physically incorporated into the host device, or the host device may communicate with the host device via a network using any suitable protocol. In some embodiments, the storage device 100 is configured to form a portion of a multi-device storage enclosure in a mass storage environment such as a distributed object storage system, a cloud-based computing environment, a RAID (redundant array of independent disks) system, etc.

Figure 2:
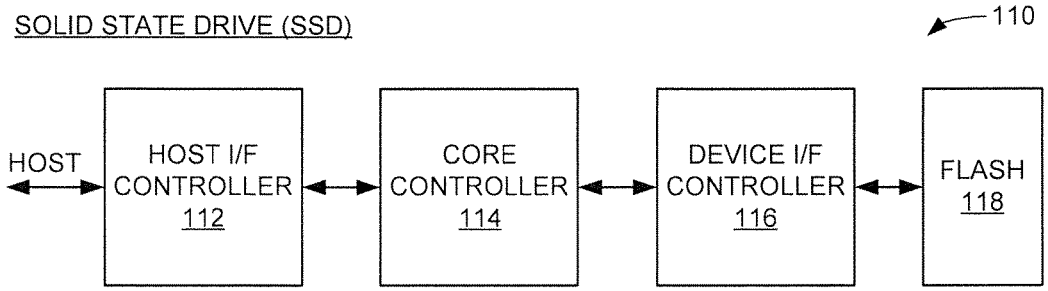
FIG. 2 shows aspects of the data storage device of FIG. 1 configured as a solid state drive (SSD) in accordance with some embodiments.

FIG. 2 is a functional block representation of a data storage device 110 in accordance with some embodiments. The device 110 generally corresponds to the device 100 and is characterized as a solid state drive (SSD) that uses two-dimensional (2D) or three-dimensional (3D) NAND flash memory as a main memory store. This is merely for purposes of illustration and is not limiting. Other circuits and components may be incorporated into the SSD 110 as desired, but such have been omitted from FIG. 2 for purposes of clarity. The circuits in FIG. 2 may be incorporated into a single integrated circuit (IC) such as a system on chip (SOC) device, or may involve multiple connected IC devices.

The controller functions from FIG. 1 are carried out by a host interface (I/F) controller circuit 112, a core controller circuit 114 and a device I/F controller circuit 116. The host I/F controller circuit 112 may sometimes be referred to as a front end controller or processor, and the device I/F controller circuit 116 may be referred to as a back end controller or processor. Each controller 112, 114 and 116 includes a separate programmable processor with associated programming (e.g., firmware, FW) in a suitable memory location, as well as various hardware elements, to execute data management and transfer functions. This is merely illustrative of one embodiment; in other embodiments, a single programmable processor (or less than three programmable processors) can be configured to carry out each of the front end, core and back end processes using associated FW in a suitable memory location.

The front end controller 112 processes host communications with a host device (not separately shown). The back end controller 116 manages data read/write/erase (R/W/E) functions with a flash memory 118. The flash memory 118, also sometimes referred to as a non-volatile memory (NVM) or main memory, may be made up of multiple flash dies to facilitate parallel data operations. The core controller 114, also referred to as the main controller or middle controller, performs the primary data management and control for the device 110.

Figure 3:
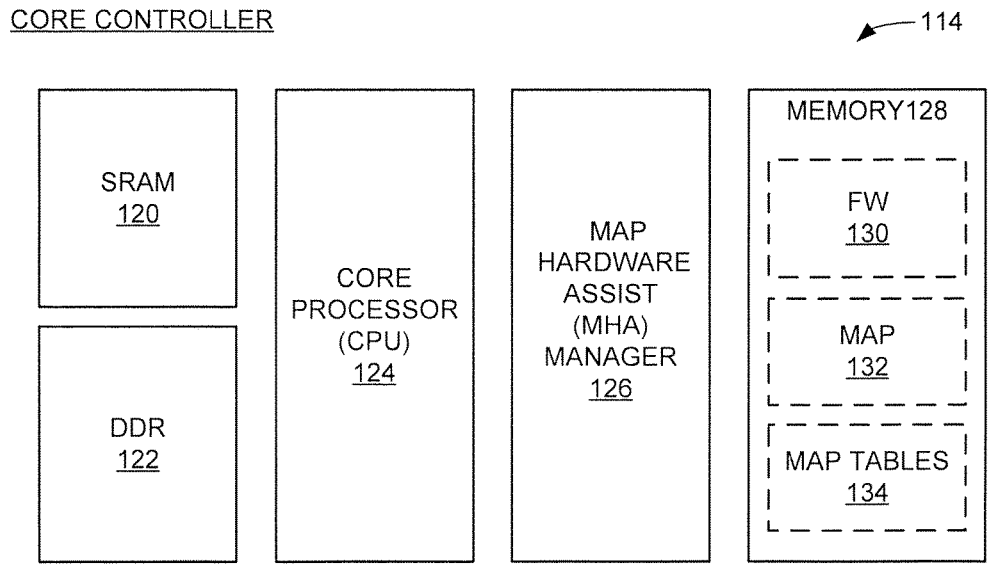
FIG. 3 is a functional block representation of a core controller of the exemplary SSD of FIG. 2.

FIG. 3 shows the core controller 114 from FIG. 2 in some embodiments. Other configurations may be used so this is merely illustrative and not limiting. An SRAM memory 120 is a volatile memory dedicated as a buffer memory space to temporarily store user data during data transfer operations with the flash 118. A DDR (DRAM/SDRAM) memory 122 is a volatile memory that may be also used as a buffer memory, as well as to store other data used by the system. The respective memories 120, 122 may be realized as a single integrated circuit (IC) or may be distributed over multiple physical memory devices that, when combined, provide an overall available memory space.

A core processor (central processing unit, CPU) 124 is a programmable processor that provides the main processing engine for the core controller 114. A map hardware assist (MHA) manager circuit 126 is a non-processor based, offload hardware circuit that carries out offload functions as directed by the core processor 124 as explained below.

A local memory is generally denoted at 128. This memory is contemplated as comprising one or more discrete local memories that can be used to store various data structures used by the core controller, including firmware (FW) programming 130 used by the core processor 126, a system map 132 and various map tables 134.

At this point it will be helpful to distinguish between the term "processor" and terms such as "non-processor based," "non-programmable" and "hardware." As used herein, the term processor refers to a CPU or similar programmable device that executes instructions (e.g., FW) to carry out various functions. The terms non-processor, non-processor based, non-programmable, hardware and the like are exemplified by the MHA manager 126 and refer to circuits that do not utilize programming stored in a memory, but instead are configured by way of various hardware circuit elements (logic gates, FPGAs, etc.) to operate. The MHA manager 126 functions as a state machine or other hardwired device. The manager has various operational capabilities and functions such as direct memory access (DMA), search, load, compare, etc.

Figure 4:
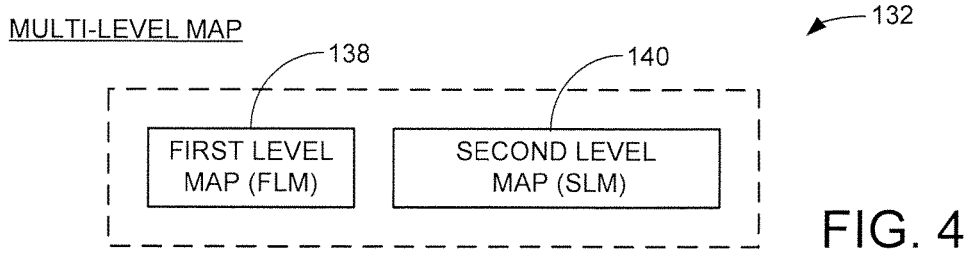
FIG. 4 shows an exemplary format for a multi-level map structure in some embodiments.

The map 132 is shown more fully in FIG. 4 as a multi-level map, with a first level map 138 and a second level map 140. While a two-level map is employed by the SSD 110, other map structures can readily be used including a single level map or a multi-level map with more than two levels.

Figure 5:
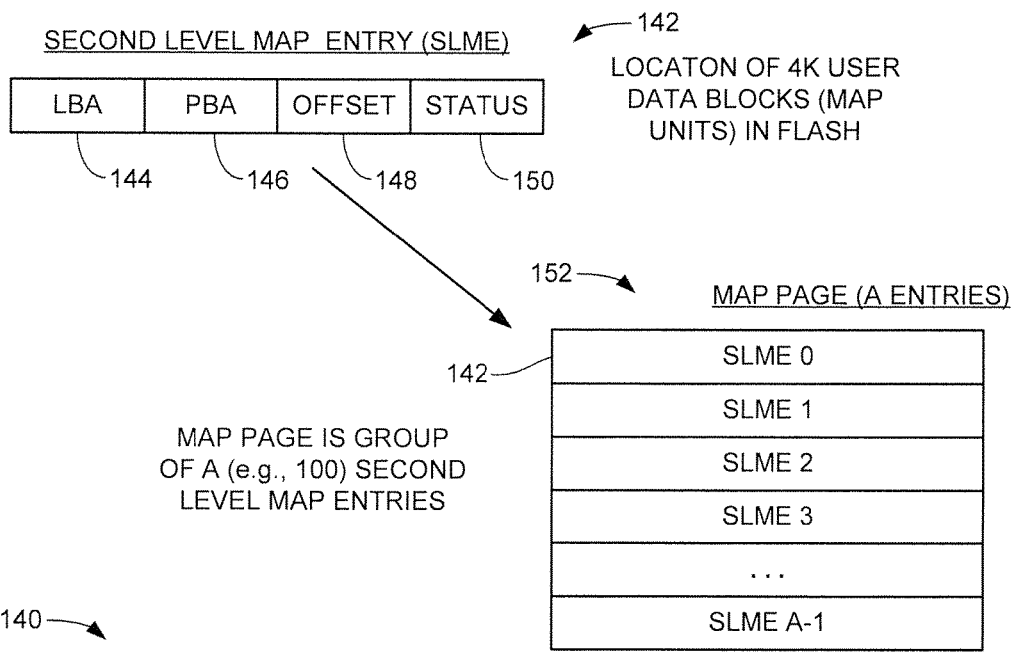
FIG. 5 shows an exemplary format for a second level map (SLM) of the map structure.
Figure 5:
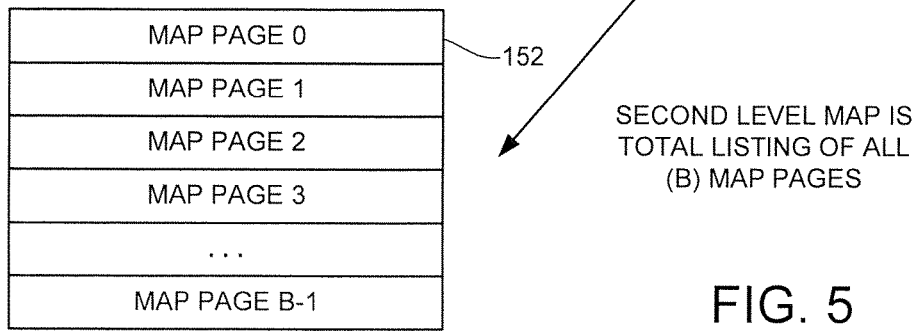

An example arrangement of the second level map (SLM) 140 is illustrated in FIG. 5. The SLM 140 is made up of a number of second level map entries 142 (SLMEs or entries), which describe individual blocks of user data resident in, or that could be written to, the flash 118. In the present example, the blocks, also referred to as map units (MUs), are set at 4 KB (4096 bytes) in length, although other sizes can be used. The SLM 140 describes the entire possible range of logical addresses of blocks that can be accommodated by the SSD 110, even if certain logical addresses have not been, or are not, used.

Each entry 142 includes a number of fields, including a logical block address (LBA) field 144, a physical block address field 146, an offset field 148 and a status field 150. Other formats may be used. The LBA values are sequential from a minimum value to a maximum value (e.g., from LBA 0 to LBA N with N being some large number determined by the overall data capacity of the SSD). Other logical addressing schemes can be used such as key-values, virtual block addresses, etc. While the LBA values may form a part of the entries, in other embodiments the LBAs may instead be used as an index into the associated data structure to locate the various entries.

In a typical flash array, data blocks are arranged as pages which are written along rows of flash memory cells in a particular erasure block. The PBA may be expressed in terms of array, die, garbage collection unit (GCU), erasure block, page, etc. The offset value may be a bit offset along a selected page of memory. The status value may indicate the status of the associated block (e.g., valid, invalid, null, etc.).

Groups of entries 142 are arranged into larger sets of data referred to herein as map pages 152. Some selected number of entries (represented by the variable A) are provided in each map page. In the present case, each map page 144 has a total of 100 entries. Other groupings of entries can be made in each page, including numbers that are a power of 2.

The second level map (SLM) 140 constitutes an arrangement of all of the map pages 152 in the system. It is contemplated that some large total number of map pages B will be necessary to describe the entire storage capacity of the SSD. Each map page has an associated map ID value, which may be a consecutive number from 0 to B. The SLM 140 is stored in the NVM (flash 118), although the SLM will likely be written across different sets of the various dies rather than being in a centralized location within the flash.

Figure 6:
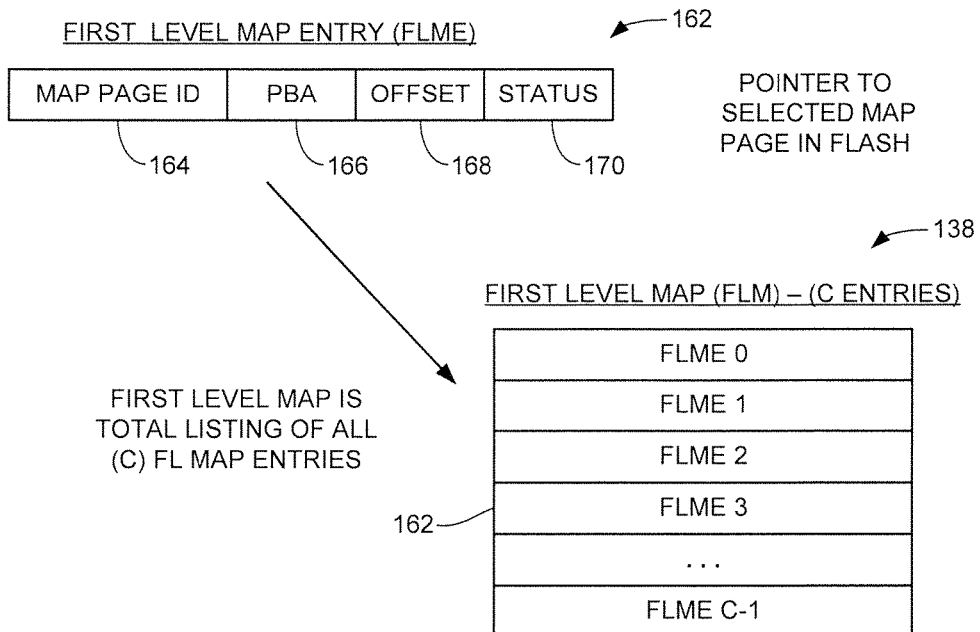
FIG. 6 shows an exemplary format for a first level map (FLM) of the map structure.

An arrangement of the first level map (FLM) 138 from FIG. 4 is shown in FIG. 6. The FLM 138 enables the SSD 110 to locate the various map pages 152 stored to flash. To this end, the FLM 138 is made up of first level map entries 162 (FLMEs or entries). Each FLME 162 has a map page ID field 164, PBA field 166, offset field 168 and status field 170. The map ID was discussed above. The PBA in field 166 describes the location of the associated map page. The offset value operates as before as a bit offset along a particular page or other location. The status value may be the same as in the second level map, or may relate to a status of the map page itself as desired. As before, while the format in FIG. 6 shows the map ID to form a portion of each entry in the first level map, in other embodiments the map IDs may instead be used as an index into the data structure to locate the associated entries.

The first level map (FLM) 138 constitutes an arrangement of all of the entries 162 from entry 0 to entry C. In some cases, B will be equal to C, although these values may be different. Accessing the FLM 138 allows a search, by map ID, of the location of a desired map page within the flash memory 118. Retrieval of the desired map page from flash will provide the second level map entries in that map page, and then individual LBAs can be identified and retrieved based on the PBA information in the associated second level entries.

Figure 7:
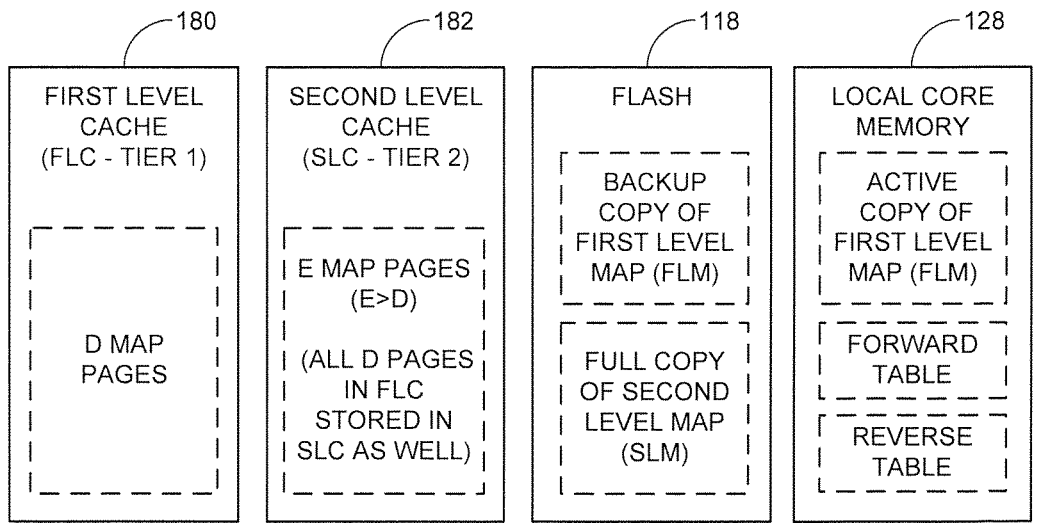
FIG. 7 illustrates various memories and contents thereof of the SSD in some embodiments.

FIG. 7 shows an arrangement of various memory locations utilized by the SSD 110 in some embodiments. These include the flash memory 118 and local core memory 128 discussed above in FIGS. 2-3, as well as a first level cache (FLC) 180 and a second level cache (SLC) 182.

The first level cache 180, also referred to as a first cache and a tier 1 cache, is contemplated as a separate memory location, such as an on-board memory of the core controller. As discussed above, map pages to be acted upon to service a pending host access command are loaded to the first cache. FIG. 7 shows a total number D map pages are resident in the first cache 180. It is contemplated that D will be a relatively small number, such as D=128, although other numbers can be used. The size of the first cache is fixed.

The second level cache 182, also referred to as a second cache and a tier 2 cache, is contemplated as constituting at least a portion of the DDR memory 122 (see FIG. 2). Other memory locations can be used. The size of the second cache may be variable or fixed. The second cache stores up to a maximum number of map pages E, where E is some number significantly larger than D (E>D). As noted above, each of the D map pages in the first cache are also stored in the second cache.

The flash 118 is primarily used to store user data blocks described by the map structure 132, but the storage of such is not denoted in FIG. 7. FIG. 7 does show that one or more back up copies of the first level map (FLM) 138 are stored in the flash memory, as well as a full copy of the second level map (SLM) 140. Back up copies of the SLM 140 may also be stored to flash for redundancy, but a reconfiguration of the FLM 138 would be required before such redundant copies could be directly accessed. As noted above, the FLM 138 points to the locations of the primary copy of the map pages of the SLM 140 in the flash.

The local core memory 128 includes an active copy of the FLM 138, which is accessed by the HMA manager (hardware circuit) 126 as required to retrieve map pages from flash as required, in a manner discussed below. The memory 128 also stores the map tables 134 from FIG. 3, which are arranged in FIG. 7 as a forward table and a reverse table.

The forward table, also referred to as a first table, is a data structure which identifies logical addresses associated with each of the map pages stored in the second cache 182. The reverse table, also referred to as a second table, identifies the physical addresses at which each of the map pages are stored in the second cache.

The forward table can be generally viewed as an LBA to DDR conversion table. By entering a selected LBA (or other input value associated with a desired logical address), the associated location in the second cache (DDR memory in this case) for that entry may be located. The reverse table can be generally viewed as a DDR to LBA conversion table. By entering a selected physical address within the second cache (DDR memory), the associated LBA (or other value associated with the desired logical address) may be located.

Figure 8:
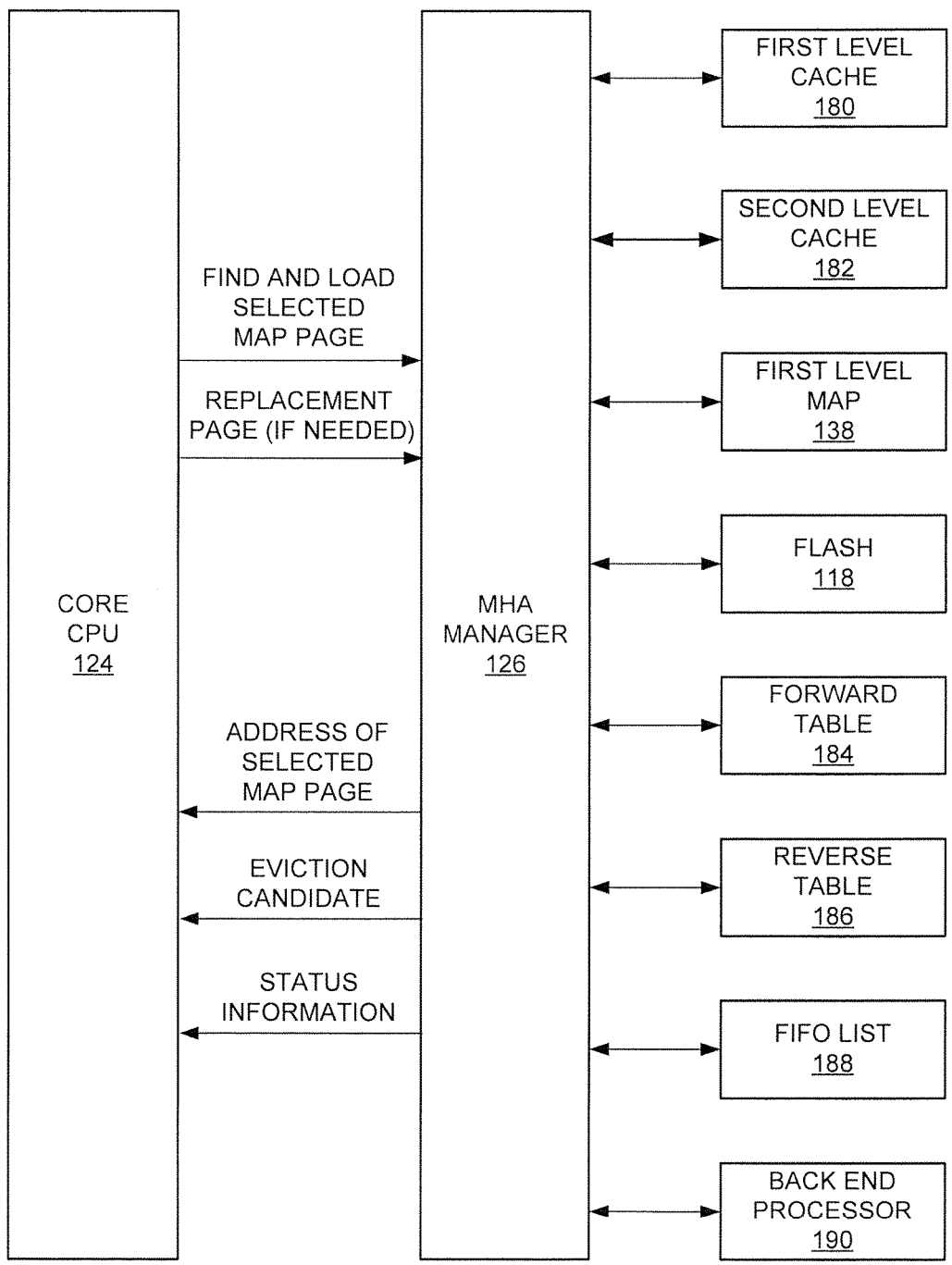
FIG. 8 is a functional block representation of communications between a core central processing unit (CPU) programmable processor and non-processor based, offload map hardware assist (MHA) manager of the core controller of FIG. 3 in some embodiments.

FIG. 8 is a functional representation to show the interactions between the core CPU (processor) 124 and MHA manager (hardware circuit) 126 from FIG. 3. It is contemplated that the operations in FIG. 8 are carried out responsive to receipt of a selected host access command, such as a read command to retrieve certain user data blocks (e.g.. LBAs) from the flash memory 118 to the SRAM buffer 122 (FIG. 2) pending transfer to the host.

In order to service the host access command, the map page or pages for the requested user data blocks need to be loaded to the first cache 180. This operation is offloaded by the processor 124 to the hardware circuit 126 by issuing a find command to the hardware circuit to find a selected (first) map page and ensure that the requested map page is in the first cache.

In some cases, the processor 124 may identify a replacement map page in the first cache that can be overwritten as necessary by the hardware circuit 126 in order to get the requested map page into the first cache. It is contemplated that the processor will maintain ultimate control over the eviction of map pages in the first cache, since the map pages may be dirty and require cleaning (e.g., updates to the map structure based on changes in user data location, etc.) before the map pages can be safely released from the first cache.

In response to the find command, the hardware circuit 126 may access various memory locations, data structures and processors including the first level cache (FLC) 180, the second level cache (SLC) 182, the first level map (FLM) 138, the flash memory 118, the forward table (denoted at 184 in FIG. 8), the reverse table (denoted at 186), a first-in-first-out (FIFO) list 188 and a back end processor 190.

The FIFO list 188 may be list of second cache addresses based on usage such as a least recently used (LRU) scheme. The back end processor 190 comprises a programmable processor in the back end controller 116 which uses associated programming (FW) to carry out programming and read operations with the flash. The hardware circuit 126 will direct read requests to the back end processor 190 so that the processor can carry out the necessary data conditioning (e.g., decoding, decompressing, error correction, etc.) to access a selected map page from the flash, rather than accessing the flash directly for a requested map page.

The core processor 124 maintains top level control of the contents of the first level cache 180, since these entries represent the most valuable map pages related to ongoing and pending data transfers. It is up to the core processor 124 to decide which map pages in the first level cache remain in the cache and which are available for eviction. Such eviction does not take place until the core processor has finished all remaining tasks associated with the map page. If the core processor 124 identifies the replacement map page in the first cache to the hardware circuit 126, in some cases the hardware circuit may proceed to overwrite the replacement page with the new requested page in the first cache so that the programmable core processor does not need to perform this operation.

The hardware circuit 126 has some measure of control over the contents of the second level cache 182, depending on the extent to which such powers are delegated by the core processor. It will be recalled that a copy of every map page in the first level cache 180 is also stored in the second level cache 182, but not vice versa. Promoting a new map page to the first level cache (either from the second level cache or from flash) will usually require an existing map page in the first level cache to be replaced since, for efficiency reasons, the first level cache will usually (or always) be full. This overwriting of the new map page to the first level cache is controlled by the core processor; even if the hardware circuit is the entity that actually writes the new map page to the first level cache, the core processor tells the hardware circuit where to place the new map page in the first level cache.

It follows that retrieval of a new map page from flash requires the new map page to both be written to the first level cache and to the second level cache. The copy that is directed to the first level cache is provided to the address identified by the core processor. The copy that is directed to the second level cache is written to an address that is ultimately determined by the hardware circuit based on the contents of the FIFO list 188 in FIG. 8.

The FIFO list 188 is an example of a data structure that is maintained by the core controller 124 of candidate locations (addresses) in the second level cache 182 that are available as candidates for eviction. The list may be generated in any number of suitable ways, such as on a least recently used (LRU) basis. The hardware circuit 126 identifies a selected address from the FIFO list, uses the reverse table 186 to identify the map page stored at the selected address, searches the first level cache 180 to see if the map page at the selected address is resident in the first level cache. If so, a different candidate address in the second level cache is identified and the process repeats. If not, the hardware circuit identifies the selected address as a location for the storage of the new map page, thereby directing the new map page to be written to this location which is carried out either by the hardware circuit or the core controller.

Figure 9A:
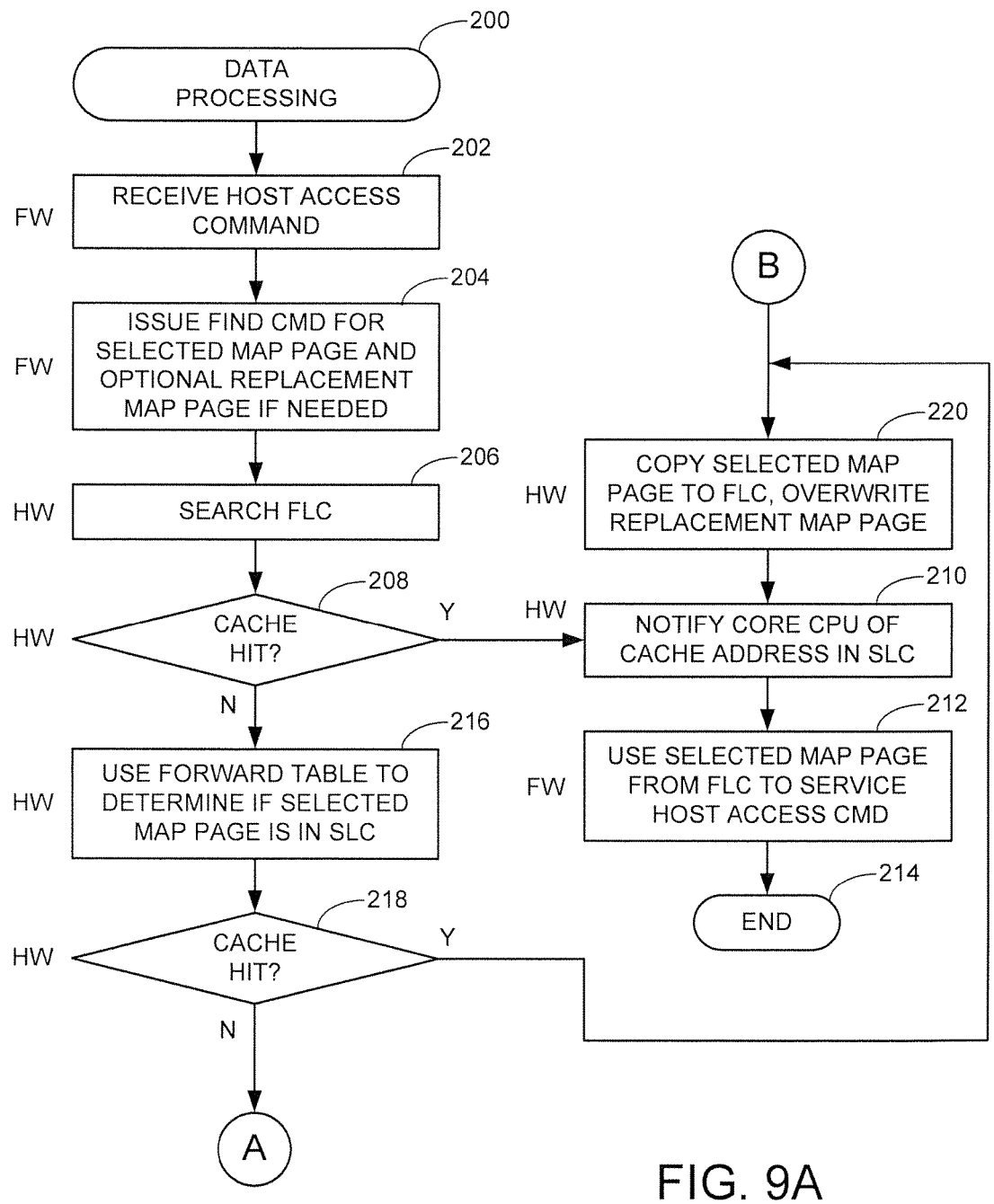
FIGS. 9A and 9B provide a flow chart for a data processing routine illustrative of steps carried out in accordance with various embodiments of the present disclosure.
Figure 9B:
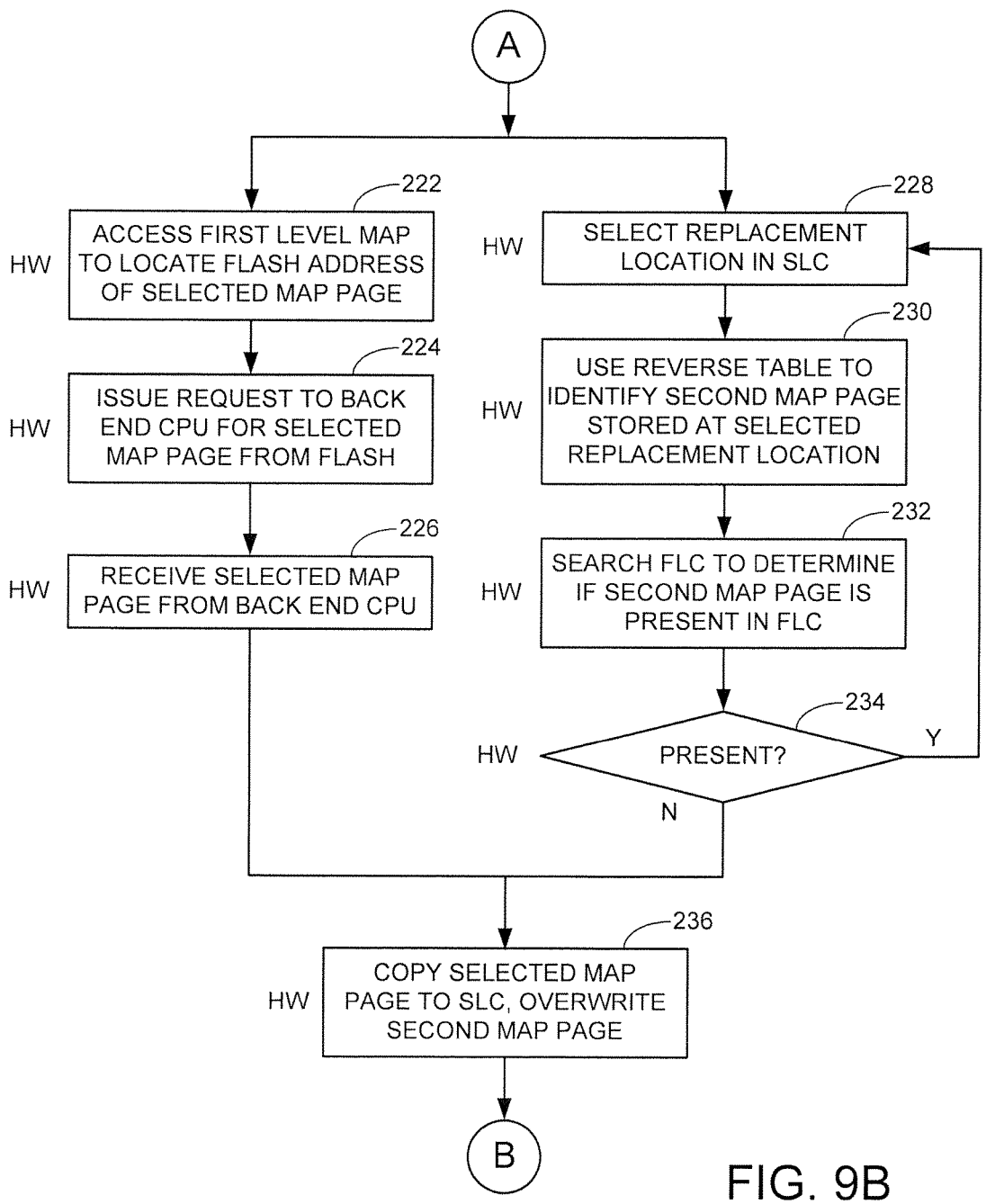

FIGS. 9A and 9B provide a data processing routine 200 illustrative of steps carried out by the arrangement of FIG. 8 in accordance with some embodiments. The routine is merely exemplary and is not limiting, as the various steps may be appended, omitted, carried out in a different order or by other modules, etc. Generally, each step in the routine is provided with an "FW" or "HW" identifier. FW refers to a step carried out by a programmable processor through the execution of firmware, and for convenience is described as being carried out by firmware. HW refers to a step carried out by the hardware circuit 126, and thus is described as being carried out by hardware.

The routine commences at step 202 upon the receipt of a host access command by the firmware. In response, a first command is issued to the hardware at step 204 to locate and, as necessary, load the selected map page ("requested map page") associated with the command into the first cache 180. A replacement map page that is currently resident in the first cache may also be identified for eviction/overwriting as required.

The hardware proceeds at step 206 to search the first level cache (FLC or first cache) for the requested map page. Decision step 208 determines whether a cache hit was obtained (e.g., the requested map page is in fact resident in the first cache). If so, the flow passes to step 210 where the hardware notifies the firmware of the physical address in the first cache. The firmware thereafter proceeds to use the map page to service the command at step 212, and the flow ends at step 214.

Should a cache miss be determined at step 208 (e.g., the selected map page is not resident in the first cache), the hardware continues at step 216 to access the forward table 184 to determine if the selected map page is located in the second level cache (SLC). Decision step 218 determines whether a cache hit was obtained on the second cache. If so, the flow passes to step 220 where the hardware copies the selected map page to the first level cache (FLC), overwriting the replacement map page identified by the firmware. Steps 210 and 212 are thereafter carried out as before.

If a cache miss is determined on the second cache (e.g., the selected map page is not resident in the second cache), the flow follows marker "A" to FIG. 9B, where two concurrent paths are taken by the hardware.

The first path commences at step 222 where the hardware accesses the first level map (FLM) 138 to locate the flash address of the selected map page (see FIG. 6). The hardware supplies the flash address to the back end processor 190 at step 224 along with a request that the selected map page be retrieved from the flash address location. The retrieved map page is received at step 226.

The second path commences at step 228 where the hardware selects a potential replacement location (physical address) in the second level cache (SLC) 182 to accommodate the retrieved map page from flash. As noted above, this can be carried out using the FIFO list 188 or similar data structure. The hardware searches the reverse table 186 at step 230 to identify which map page is located at the replacement location, and searches the first level cache (FLC) 180 to determine if this map page is in the first cache. If so, decision step 234, a new potential replacement location is selected and the process is repeated until a suitable candidate replacement location is found.

Thereafter, the two paths converge at step 236 where the hardware copies the selected map page retrieved from the flash memory to the candidate replacement location in the potential replacement map page, and the routine follows marker "B" back to FIG. 9A for execution of steps 220, 210 and 212.

It will be noted that, if the hardware is configured to actually perform the eviction in the second cache, then the management of the contents of the second cache may be viewed as being under the control of the hardware. Alternatively, management of both the first cache and the second cache may be maintained by the processor (firmware), so that the firmware make the ultimate determination. In both cases, a notification is made by the hardware to the firmware of the candidate replacement map page in the second cache.

It can be seen that maintaining a partial map in the second cache can significantly enhance the loading of map pages to the first cache since the back end processor need not be involved to retrieve map pages from the flash. Even if the firmware ultimately decides what map pages stay in the second cache, the evaluation by the hardware table using the reverse table can significantly reduce the workload upon the firmware in making this determination.

The foregoing discussion has contemplated the programmable processor as directly communicating the find command to the hardware circuit, such is not required. Other embodiments contemplate command processing using additional non-programmable hardware so that hardware talks to hardware during the process, although under control of higher level firmware.

As discussed above, the hardware circuit can be configured to retrieve the requested map page directly from the flash rather than issuing a request to the back end processor (which may be the same processor as the core processor).

While user data have been considered as the subject of the find command, other forms of data may be retrieved as well, such as metadata that describes the state of the system, such as but not limited to information regarding user data in the system.

One aspect of the hardware circuit is the ability to select entries from the second cache that are suitable candidates for eviction from the second cache automatically. The reverse table can take any suitable format to identify such candidates, and would include a linked-list or some other simple structure which would provide the required information.

Accordingly, reference to the reverse table is not necessarily limited to an actual look up table, but rather any form of metadata suitable for performing as above indicating map page by address in the second cache. In other embodiments, the candidate for eviction can be identified by the hardware circuit and the hardware circuit can actually manage the eviction automatically without necessarily notifying the programmable processor, and so on.

It will now be understood that the various embodiments disclosed herein can provide a number of benefits. Using an offload hardware circuit to manage map data in a multi-level cache can significantly accelerate the map loading function and increase processor efficiency. While various embodiments have contemplated the environment of a solid state drive (SSD) with flash memory, other configurations can readily be used including different forms of storage memory, different numbers of caches, etc.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
 a map structure stored in a non-volatile memory (NVM) as a plurality of map pages that associate logical addresses of user data blocks with physical addresses in the NVM at which the user blocks are stored;
 a first cache which stores a copy of a first subset of the map pages stored in the NVM;
 a second cache which stores a copy of the first subset of the map pages as well as a copy of a second subset of the map pages stored in the NVM;
 a programmable processor having programming stored in an associated memory which, when executed, issues a find command to locate and place a requested map page associated with a received host command into the first cache; and
 a non-programmable hardware circuit configured to, responsive to the find command, direct a retrieval of the requested map page from the NVM, access a reverse table in a memory to identify a potential replacement map page stored at a selected physical address in the second cache, and direct a writing of a copy of the requested map page to the selected physical address in the second cache responsive to a determination by the non-programmable hardware circuit that the potential replacement map page is not in the first subset of the map pages in the first cache.

2. The apparatus of claim 1, further comprising a first in first out (FIFO) list of physical addresses in the second cache as a data structure in a memory, the non-programmable hardware circuit further configured to select a first physical address from the FIFO list as the selected physical address, index the reverse table to identify the potential replacement map page as a first map page stored at the first physical address, and search the first cache to determine the first map page is not a member of the first subset of map pages stored in the first cache.

3. The apparatus of claim 2, wherein responsive to a determination by the non-programmable hardware circuit that the potential replacement map page is a member of the first subset of map pages stored in the first cache, the non-programmable hardware circuit is further configured to select a second physical address from the FIFO list as the selected physical address, index the reverse table to identify the potential replacement map page as a second map page stored at the second physical address, and search the first cache to determine the second map page is not a member of the first subset of map pages stored in the first cache.

4. The apparatus of claim 1, wherein the non-programmable hardware circuit directs the writing of a copy of the requested map page to the selected physical address in the second cache by performing the writing of the copy of the requested map page to the selected physical address in the second cache.

5. The apparatus of claim 1, wherein the non-programmable hardware circuit directs the writing of a copy of the requested map page to the selected physical address in the second cache by providing a notification of the selected physical address to the programmable processor, followed by the writing of the copy of the requested map page to the selected physical address by the programmable processor.

6. The apparatus of claim 1, wherein the reverse table is a conversion table that associates logical addresses by physical addresses in the second cache so that, by entering a selected physical address of the second cache into the reverse table, the reverse table indicates the corresponding map page stored at that selected physical address.

7. The apparatus of claim 1, wherein the non-programmable hardware circuit is further configured to search a forward table in a memory stored as a data structure arranged as a conversion table that associates physical addresses in the second cache to logical addresses associated with the map pages so that, by entering a selected logical address into the forward table, the forward table indicates the corresponding selected physical address in the second cache at which the map page associated with the selected logical address is stored.

8. The apparatus of claim 1, wherein the non-programmable hardware circuit is further configured to search the first cache and notify the programmable processor of a physical address of the first cache at which the requested map page is stored responsive to the find command and responsive to a cache hit on the first cache.

9. The apparatus of claim 1, wherein the programmable processor is further configured to identify to the non-programmable hardware circuit a second potential replacement map page in the first cache in conjunction with the find command, wherein the non-programmable hardware circuit is further configured to overwrite the second potential replacement map page in the first cache with the requested map page.

10. The apparatus of claim 1, wherein the programmable processor is a core programmable processor that provides overall processing control for a data storage device, and the apparatus further comprises a back end programmable processor having programming stored in an associated memory configured to direct programming and read operations to transfer data between the NVM and a buffer memory, wherein the non-programmable hardware circuit is further configured to, responsive to a cache miss on the second cache for the requested map page, issue a read request to the back end programmable processor to retrieve the requested map page from the NVM.

11. The apparatus of claim 1, wherein upon location of the requested map page in the second cache responsive to a forward table indicating the requested map page is in the second cache, the non-programmable hardware circuit is further configured to perform at least a selected one of copying the requested map page from the second cache to the first cache or provide a pointer to the programmable memory that identifies the physical location of the requested map page in the second cache.

12. A data storage device, comprising:
 a non-volatile memory (NVM) which stores a map structure arranged as total number of map pages that associate logical addresses of user data blocks with physical addresses of the NVM at which the user data blocks stored;
 a first cache which stores a first number of the map pages less than the total number;
 a second cache which stores a second number of map pages less than the total number, the second number of map pages including each of the first number of map pages;
 a forward table stored as a data structure in a memory which identifies logical addresses associated with each of the second number of map pages stored in the second cache;
 a reverse table stored as a data structure in a memory which identifies physical addresses of the second cache memory at which each of the second number of map pages are stored;

a programmable processor having programming stored in an associated memory configured to issue a find command to find a requested map page responsive to receipt of a host access command from a host; and a hardware circuit characterized as a non-processor based, map hardware assist manager circuit configured to:

responsive to the find command, search the first cache and notify the programmable processor of a physical address of the first cache at which the requested map page is stored;

responsive to a cache miss on the first cache, search the forward table and copy the requested map page from the second cache to the first cache responsive to the forward table indicating the requested map page is in the second cache; and responsive to a cache miss on the second cache, search the reverse table to identify a second map page stored at the selected physical address, search the first cache to determine the second map page is not stored in the first cache, and identify to the programmable processor the potential replacement map page as a candidate for eviction from the second cache.

13. The data storage device of claim 12, wherein the programmable processor is further configured to identify to the non-programmable hardware circuit a potential replacement map page in the first cache in conjunction with the find command, wherein the hardware circuit is further configured to overwrite the potential replacement map page in the first cache with the requested map page.

14. The data storage device of claim 12, wherein the programmable processor is a core programmable processor that provides overall processing control for a data storage device, and the data storage device further comprises a back end programmable processor having programming stored in an associated memory configured to direct programming and read operations to transfer data between the main memory and a buffer memory, wherein the hardware circuit is further configured to, responsive to a cache miss on the second cache for the requested map page, access the map structure to identify a main memory physical address in the main memory at which the requested map page is located, and to supply the main memory physical address to the back end processor in conjunction with a read request to the back end programmable processor to retrieve the requested map page from the main memory.

15. The data storage device of claim 12, further comprising a first-in-first-out (FIFO) list as a data structure in a local memory accessed by the hardware circuit to identify the selected physical address in the second cache as an input to the reverse table, the FIFO list arranging locations in the second cache on a least recently used (LRU) basis.

16. The data storage device of claim 12, wherein the map structure comprises a multi-level map comprising a first level map and a second level map, the second level map stored in the main memory and comprising a plurality of map pages including the requested map page, the first level map comprising entries that identify physical addresses at which the plurality of map pages are stored in the main memory, and wherein a first number of the map pages of the second level map are stored in the first cache, a second, greater number of the map pages of the second level are stored in the second cache, and each map page stored in the first cache is also stored in the second cache.

17. The data storage device of claim 12, characterized as a solid state drive (SSD), wherein the main memory comprises a flash memory array.

18. A method comprising:

issuing a find command by a programmable processor having programming stored in an associated memory to locate and place a requested map page of a map structure into a first cache to service a received host command, the requested map page associating a logical address of a user data block with a physical address in a non-volatile memory (NVM) at which the user data block is stored;

using a non-programmable hardware circuit to:

search a forward table and copy the requested map page from a second cache to the first cache responsive to the forward table indicating the requested map page is in the second cache and responsive to a cache miss on the first cache, the forward table stored as a data structure in a memory which identifies logical addresses associated with each of a plurality of map pages of the map structure stored in the second cache; and identify a selected physical address in the second cache, search a reverse table to identify a potential replacement map page stored at the selected physical address, search the first cache to determine the potential replacement map page is not stored in the first cache, and direct overwriting of the requested map page to the selected physical address in the second cache.

19. The method of claim 18, further comprising using the non-programmable hardware circuit to search the first cache and notify the programmable processor of a physical address of the first cache at which the requested map page is stored responsive to the find command and responsive to a cache hit on the first cache.

20. The method of claim 18, further comprising operating the non-programmable hardware circuit to, responsive to a cache miss on the second cache for the requested map page, access the map structure to identify a physical address in the NVM at which the requested map page is located, and to supply the physical address along with a read request to a back end processor to retrieve the requested map page from the NVM, the back end processor comprising a second programmable processor having associated programming stored in a memory to program and read data to and from the NVM.

* * * * *